UNITED STATES PATENT OFFICE.

LAWRENCE NIEWIND AND HARRY NIEWIND, OF CINCINNATI, OHIO.

COMPOSITION OF MATTER TO BE USED FOR SANITARY SWEEPING PURPOSES.

No. 858,413.  Specification of Letters Patent.  Patented July 2, 1907.

Application filed January 7, 1907. Serial No. 351,139.

*To all whom it may concern:*

Be it known that we, LAWRENCE NIEWIND and HARRY NIEWIND, citizens of the United States, residing at 2536 West Sixth street, Cincinnati, in the county of Hamilton and State of Ohio, have invented a new and useful Composition of Matter to be Used for Sanitary Sweeping Purposes, of which the following is a specification.

Our composition consists of the following ingredients, combined in the proportions stated, viz:—sand, 50%; sawdust, 30%; oil, 5%; corn meal, 5%; hardwood ashes, 8%; salammoniac, 2%; to this will be added any kind of coloring to suit the character of the work. These ingredients are to be thoroughly mingled by agitation.

The sand is used as a separator, the oil to collect and absorb the dust, the sawdust to absorb the oil, the corn-meal to cleanse, the hardwood ashes to destroy germs, the salammoniac to prevent combustion, the coloring matter is for the purpose of satisfying the taste of the purchaser or user. For the oil or oily substance we employ kerosene or any other product of petroleum or in fact any non-volatile oil.

We claim:

1. The herein-described composition of matter, consisting of sand, sawdust, oil, corn-meal, hardwood ashes, and salammoniac, substantially as described, and for the purpose specified.

2. The herein-described composition of matter for sanitary sweeping purposes, consisting of sand, 50%; sawdust, 30%; oil, 5%; corn-meal, 5%; hardwood ashes, 8%; and salammoniac, 2%, substantially as described.

LAWRENCE NIEWIND.
HARRY NIEWIND.

Witnesses:
JOHN Q. MARTIN,
C. L. SWAIN.